June 16, 1936. H. W. SNYDER 2,044,109
LOCOMOTIVE STOKER
Filed Dec. 29, 1933 3 Sheets-Sheet 2
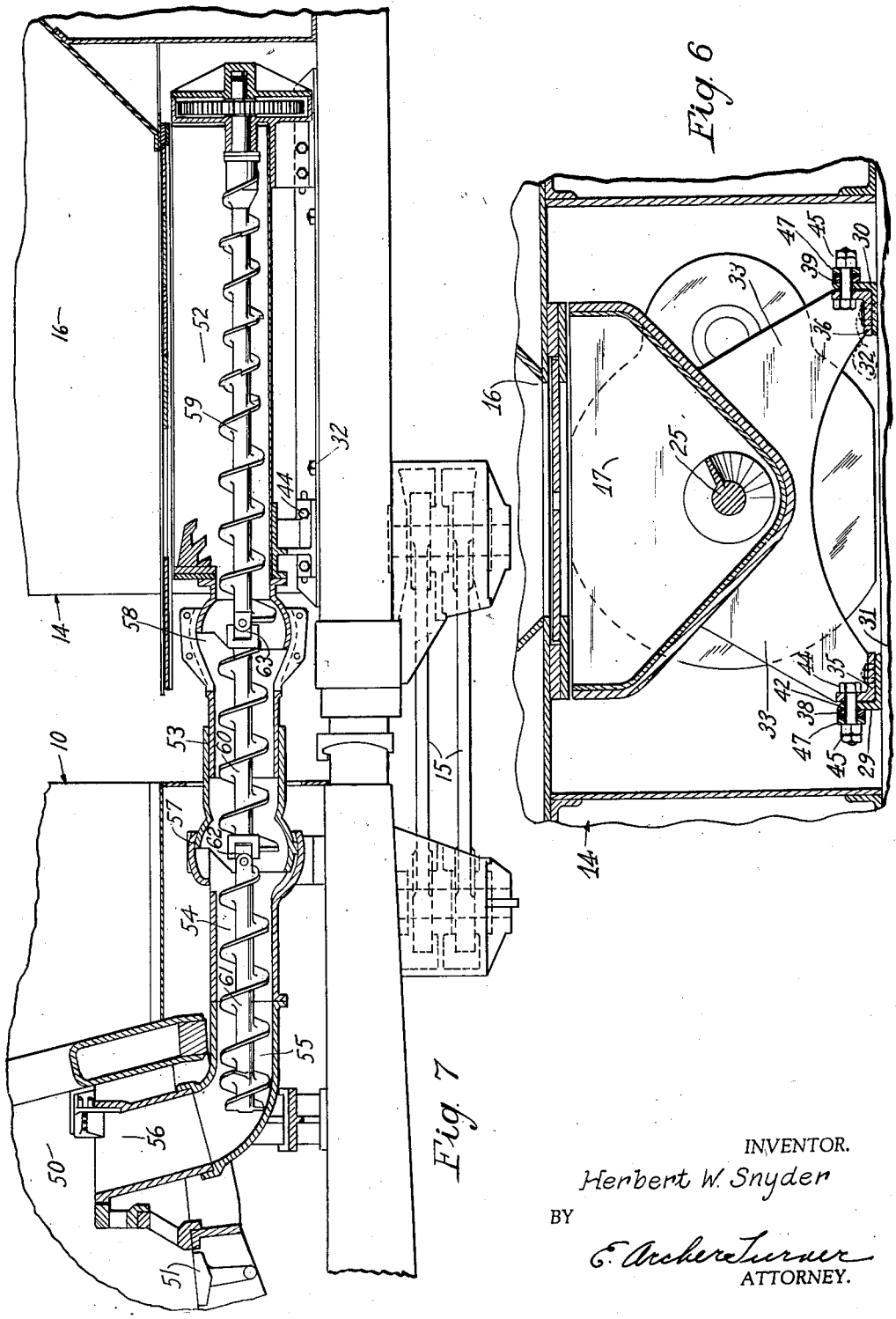
INVENTOR.
Herbert W. Snyder
BY
E. Archer Turner
ATTORNEY.

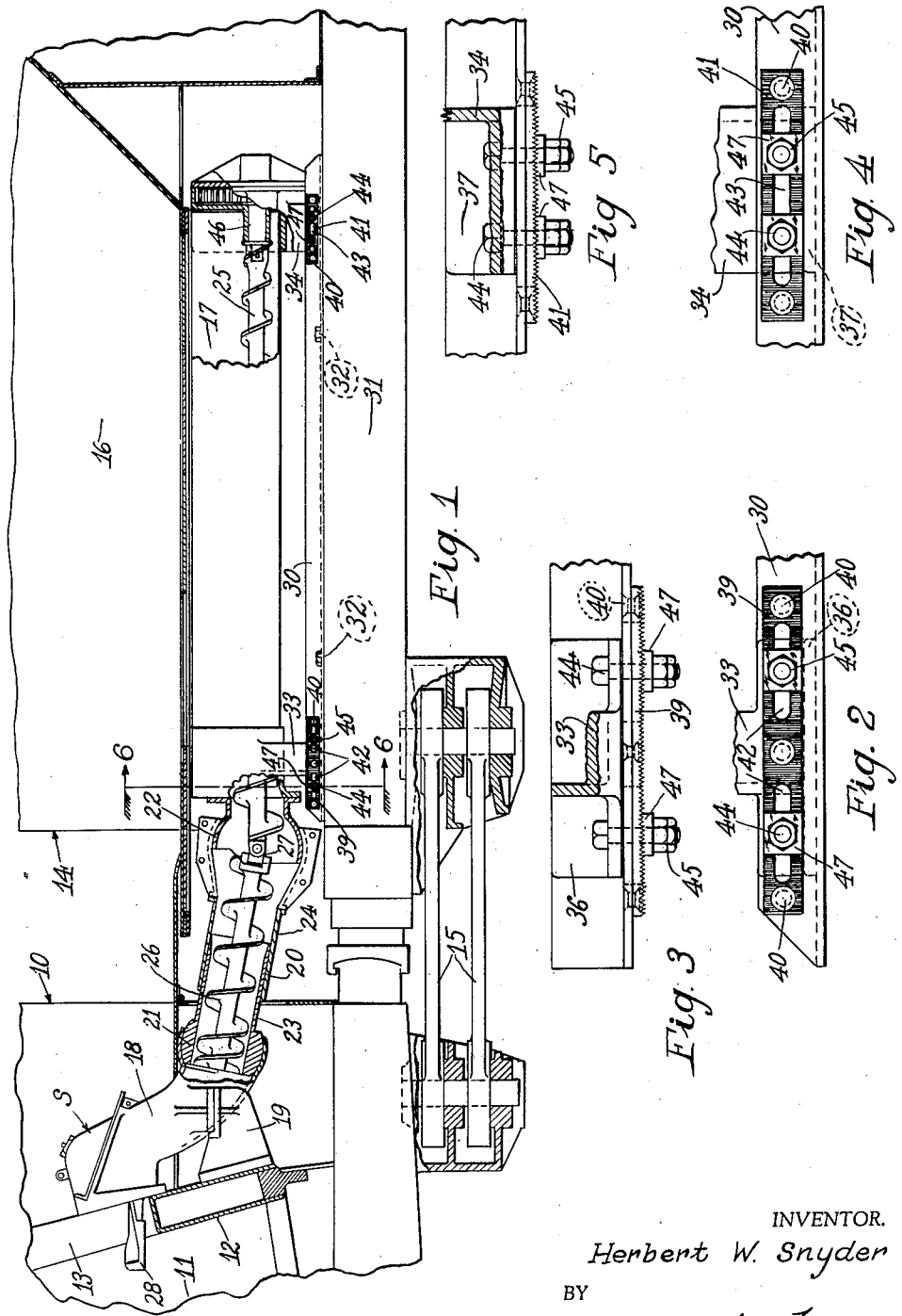

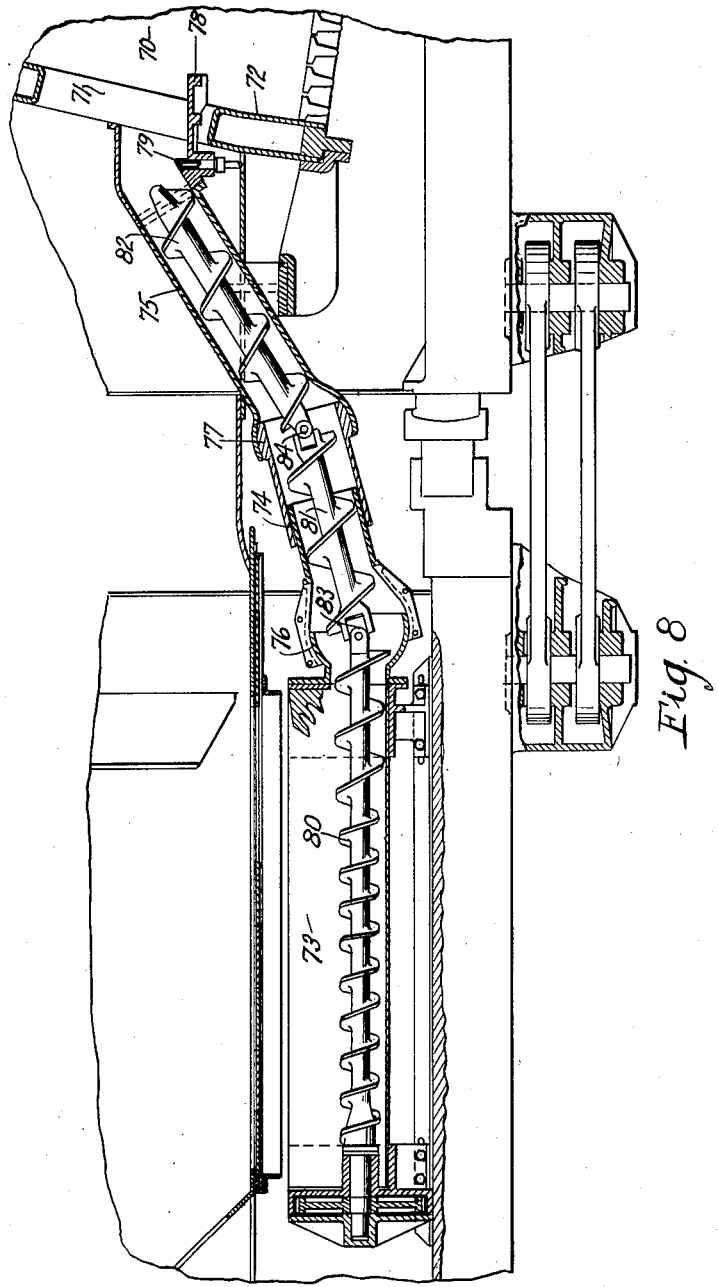

Patented June 16, 1936

2,044,109

UNITED STATES PATENT OFFICE 2,044,109

LOCOMOTIVE STOKER

Herbert W. Snyder, Lima, Ohio, assignor to The Standard Stoker Company, Incorporated, a corporation of Delaware Application December 29, 1933, Serial No. 704,417

5 Claims. (Cl. 198—15)

This invention relates to stokers and particularly to stokers for locomotives comprising a sectional conduit and conveying system, in which the rearward conduit or trough is rigidly mounted on the tender, the forward conduit or discharge casing is rigidly mounted on the locomotive and an extensible and contractible conduit or intermediate section is flexibly connected at one end with the trough and at the other end with the discharge casing. A sectional screw conveyor advances fuel through the conduit sections, one screw section being mounted in the trough and universally connected at its forward end to a screw section in the intermediate conduit. Depending upon the type of stoker, a screw section may or may not be employed in the forward conduit.

In stokers of this type it is important that the forward end of the screw conveyor should terminate at a particular point in the conduit system. For example, in several common forms of stokers the forward conduit is in the form of an elbow and it is important that the screw conveyor should terminate in the elbow at a particular point. If this position is not maintained, the delivery of fuel through the elbow, the distribution of the coal into the firebox and the steam pressure required to run the stoker are all affected. This point having been established, it should be maintained to insure entirely satisfactory and economical use of the stoker. In some stokers the forward end of the screw conveyor should terminate at a particular point in the conduit to establish a certain relation between the end of the screw and the fuel distributing device.

In the type of stokers, that in addition to a screw in the trough section and a screw in the intermediate conduit, employ a screw in the forward conduit section, it is of great importance that the universal joints between the screw sections be positioned at a particular point within the universal joint formation of the conduits housing the screw conveyor. The universal joint between the screw sections should be centered within the universal joint formation housing the joint between the screws. If the universal joint is not centered there is danger of the end of the screw adjacent the joint striking the conduit wall when the locomotive rounds a sharp turn.

It has been necessary therefore in making stoker installations, to secure the trough in position on the tender after the locomotive and tender are coupled. This is objectionable since it is a very difficult job to drill the necessary holes, for the holding of the trough, in the confined space between the trough and sides of the coal compartment. Even if secured in position in this manner, it is found that wear on the universal joint connections between the screw sections, on the thrust washers and associated parts together with wear of the draw bars between the locomotive and tender, forces the screw conveyor back from its original terminal point in the conduit a distance equivalent to such wear. When this distance exceeds a certain limit it is necessary to reposition the trough involving relocating bolt holes or other similar changes all of which require considerable time and increase maintenance costs.

The present invention permits application of the trough to the tender in the tender shop and when the locomotive and tender are coupled, the trough can be easily adjusted to its proper position and secured there rigidly by the simple expedient of drawing up several bolts. The invention furthermore permits convenient repositioning of the trough when wear on the draw bars or other parts has affected the original location of the conveyor screw in the conduit system. The means for adjusting the trough is simple in construction, is easily manipulated, readily installed, permits quick adjustment, and requires no dismantling or alteration of any parts of the stoker.

With the above and other objects and advantages in view, the invention consists in the features of construction, the combination of elements and arrangement of parts hereinafter more fully described and claimed, and illustrated in the accompanying drawings, in which Fig. 1 is a central longitudinal vertical section through a portion of a locomotive and tender, with a stoker embodying the invention applied thereto and shown in side elevation, parts of the stoker being broken away and shown in section, Fig. 2 is an enlarged fragmentary view in side elevation of a portion of Fig. 1 showing one element of the novel adjusting means, Fig. 3 is a plan view of Fig. 2, Fig. 4 is an enlarged fragmentary view in side elevation of a portion of Fig. 1 showing another element of the novel adjusting means, Fig. 5 is a plan view of Fig. 4, Fig. 6 is a section on the line 6—6 of Fig. 1, Fig. 7 is a central longitudinal vertical section through a portion of a locomotive and tender, with a modified form of stoker embodying the invention applied thereto and shown in central longitudinal vertical section with parts in elevation, and, Fig. 8 is a central longitudinal vertical section, through a portion of a locomotive and tender, with another form of stoker embodying the invention applied thereto.

In the drawings, referring particularly to Figures 1 to 6, the numeral 10 indicates a conventional form of locomotive having a firebox 11 provided with a backhead 12 having a firing opening 13 therethrough. The locomotive is coupled to the tender 14, as is customary, by the draw bars 15 arranged to permit articulation therebetween. Coal is transferred from the bin 16 of the tender to the firebox 11 of the locomotive by a stoker indicated generally by the letter s.

The conduit system of the stoker comprises a rearward trough section 17 rigidly mounted on the tender beneath the bin 16, the forward or discharge conduit 18 rigidly fixed on the locomotive, as by the bracket 19, and an extensible and contractible intermediate conduit section 20 at its ends flexibly connected with the trough and discharge conduit by the universal joint formations of sections at 21 and 22. The intermediate conduit section comprises the telescopically related sections 23 and 24. The discharge conduit 18 curves forwardly and upwardly from the forward end of the intermediate conduit 20 to the firing opening 13.

Fuel is advanced through the conduit system by a sectional screw conveyor comprising a rearward section 25 mounted in the trough 17 and the forward section 26 housed in the intermediate conduit 20. The screw sections are flexibly connected by the universal joint 27 adjacent the universal connection 22 of the trough and intermediate conduit. The rearward end of the sectional screw conveyor is journaled in the bearing 46, the latter being at the rear of and formed with the trough 17. Thus movement or adjustment of the trough with respect to the tender causes similar movement or adjustment of the sectional screw conveyor. The fuel is received on a distributing plate 28 from which it is projected into the firebox 11 by suitable means, not shown.

A very important feature in connection with the successful operation of stokers of the type described is to provide and maintain the correct relation between the forward end of the screw section 26 and the conduit system. The forward screw section 26 should be so applied that the front end is flush with the front end of the conduit section 20. If this position is not provided, the distribution of the coal in the firebox, the steam pressure required to operate the stoker and the necessary clearance for the screw at the front end are all disadvantageously affected.

The present invention provides simple and convenient means whereby the proper relation of the screw and conduit may be effected when installing a stoker of the type described and whereby the original location of the screw in the conduit system may be maintained to compensate for wear on the draw bar connections or other parts.

A pair of parallel, spaced angles 29 and 30 extend longitudinally of the tender and are securely attached to the tender frame 31 by suitable fastening means, as by the bolts 32. The trough 17 is provided at its forward and rearward ends with the depending transversely extending trough supporting legs 33 and 34, respectively, each of which has flange members formed therewith arranged to slide in the angles 29 and 30 when placing the trough in position on the tender. The leg 33 is provided with the flange members 35 and 36 and the leg 34 has similar flange members, one of which is shown in Fig. 5 at 37.

On each of the outer upstanding sides of the angles 29 and 30 and near their forward ends are corrugated plates 38 and 39, secured thereto by suitable means, as by rivets 40. Similarly, on each of the outer upstanding sides of the angles 29 and 30 and near their rearward ends, are rigidly secured corrugated plates, one of which is shown at 41. Each of the angles 29 and 30 and their attached corrugated plates 38 and 39 are provided respectively with a pair of registering horizontal openings forming slots 42. If desired the pair of slots 42 may be joined to form a single slot. Similarly, each of the angles 29 and 30 and their attached corrugated plates 41 are provided with registering horizontal openings, forming slots, one of which is shown at 43. The number and dimensions of the slots may be altered as found desirable or convenient.

Each of the flanges 35, 36, and 37 are provided with bolts 44 that pass through one of the slots 42, 43 and carry at their free ends a corrugated washer 47 arranged to engage the corrugated plates 38, 39 and 41. The lock nuts 45 when drawn up tight cause the corrugated washers and plates to engage, thereby securing the trough 17 rigidly in position.

In making stoker installations on new power, the trough, slotted angles and corrugated plates, corrugated washers and bolts can all be assembled in the tender shop. Then when the locomotive and tender are assembled, the trough can be slid forward or backward along the angles 29 and 30 a distance necessary to place the forward end of the screw conveyor in its proper location, and then rigidly secured by drawing tight the lock nuts 45. When, because of wear on the draw bars or other parts, the forward end of the screw conveyor is improperly positioned in the conduit, it is only necessary to loosen the lock nuts 45, slide the trough 17 forward or backward until the forward end of the screw conveyor again assumes its proper position and tighten the lock nuts 45.

In Fig. 7 is shown a stoker of the type delivering fuel within the firebox 50 upwardly through the grate 51 and comprising a conduit system including a trough 52, a telescopic conduit section 53, a horizontally disposed conduit section 54, an upturned elbow section 55 forming a continuation of the section 54, and a housing or mouth section 56 seated in the elbow section and projecting through the grate 51 to a height within the firebox sufficient to permit distribution of fuel in aerial paths over the firebed. The telescopic conduit section 53 is flexibly connected at its ends with the trough 52 and conduit section 54 by the universal joint formations of the sections at 57 and 58.

A screw conveyor advances fuel through the conduit system and comprises the section 59 mounted in the trough 52, the section 60 in the telescopic conduit 53 and the section 61 in the conduit and elbow sections 54 and 55. The screw sections are universally connected at 62 and 63 within the universal joint formations 57 and 58, respectively. It is important that the forward end of the screw conveyor terminate at a particular point in the elbow 55 and that the universal joint 62 be positioned in a certain relation with the universal joint formation 57. The proper location of the screw section 61 having been determined, it may be effected in all stoker installations by the adjustable means described in connection with Figures 1 to 6.

In stokers of the type described, wear on the draw bars and other parts forces the screw conveyor back from its original position and the correct relation between the forward end of the screw section 61 and the elbow 55, and the relation of the universal joint 62 with the universal joint formation 57 is disadvantageously affected. As described in connection with Figures 1 to 6, the adjustable means permits the trough and screw conveyor to be conveniently and easily moved so that the screw section 61 can be returned to its original position.

In Fig. 8 is shown a stoker of the type delivering fuel to the firebox 70 through the firing opening 71 in the boiler backhead 72 and comprises a conduit system including a trough 73, a telescopic conduit section 74 and a riser conduit 75. The telescopic section 74 is flexibly connected at its ends with the trough 73 and riser conduit 75 by the universal joint formations of the sections at 76 and 77.

A screw conveyor advances fuel through the conduit system to the distributor plate 78 from which it is projected over the fire by a blast of fluid under pressure issuing from the distributor jet head 79. The screw conveyor comprises the section 80 mounted in the trough 73, the section 81 in the telescopic conduit 74 and the section 82 in the riser conduit 75. The screw sections are universally connected at 83 and 84 within the universal joint formations 76 and 77, respectively. In stokers of this type, it is important that the forward end of the screw conveyor terminate in the riser conduit 75 in a particular relation with the fuel distributing means 78 and 79 and that the universal joint 84 be positioned in a certain relation with the universal joint formation 77.

As described in connection with Figures 1 to 7, the novel adjustable means permits the proper positioning of the screw conveyor in the conduit system, both in new stoker installations and in stoker equipped locomotives and tenders in which the correct location of the forward screw has been altered by reason of wear on the draw bars and other associated parts.

I claim:

1. In an intercoupled locomotive and tender, said locomotive being provided with a firebox and said tender having a fuel bin, a stoker transferring fuel from said bin to the locomotive firebox comprising a conduit system including a trough section mounted on the tender beneath said bin, a conduit section rigidly secured to the locomotive communicating with the firebox, a telescopically arranged intermediate conduit section flexibly connecting the adjacent ends of the trough and the rigidly secured conduit section, a flexibly related sectional screw conveyor mounted in said conduit system, a bearing at the rear of and formed with said trough, the rearward end of said sectional screw conveyor being journaled in said bearing, and means for adjustably securing said trough rigidly in any one of a number of positions longitudinally of the tender whereby the forward end of the screw conveyor may be brought to a predetermined position in the conduit system, said means including a plurality of upstanding longitudinally extending corrugated members rigidly secured with the tender frame, said corrugated members being provided with elongated horizontal slots, members for supporting the trough from the tender frame, said support members carrying means extending through said elongated slots, said means carrying corrugated washers arranged for engagement with said corrugated members and means holding said corrugated members and washers in engagement for rigidly securing the trough in its adjusted position.

2. In combination, a tender having a frame, upstanding members rigidly secured to said frame, corrugated plates secured to said upstanding members and extending longitudinally of the tender, said corrugated plates being provided with elongated horizontal slots, a stoker trough mounted in said tender above said frame, means for supporting the trough from said frame, said supporting means carrying means extending through said elongated slots permitting adjustment of the trough longitudinally of the tender, said last named means carrying corrugated members arranged for engagement with said corrugated plates and means holding said corrugated plates and members in engagement for rigidly securing the trough in its adjusted position.

3. In combination, a tender having a frame, a plurality of upstanding longitudinally extending corrugated members, means for rigidly securing said corrugated members with the frame, said corrugated members being provided with elongated horizontal slots, a stoker trough mounted in said tender above said frame, means for supporting the trough from said frame, said support members carrying bolts extending through said elongated slots permitting adjustment of the trough longitudinally of the tender, said bolts at their free ends carrying corrugated washers arranged for engagement with said corrugated upstanding members and lock nuts for holding said corrugated upstanding members and washers in engagement for rigidly securing the trough in its adjusted position.

4. In combination, a tender having a frame, a pair of spaced longitudinally extending angles secured rigidly to said frame, a stoker trough mounted in said tender above said frame, means for supporting said trough from said frame, corrugated plates secured to said angles provided with elongated horizontal slots, said supporting means carrying bolts extending through said elongated slots permitting adjustment of the trough longitudinally of the tender, said bolts at their free ends carrying corrugated washers arranged for engagement with said corrugated plates and lock nuts for holding said corrugated plates and washers in engagement for rigidly securing the trough in its adjusted position.

5. In an intercoupled locomotive and tender, said locomotive being provided with a firebox and said tender having a fuel bin, a stoker transferring fuel from said bin to the locomotive firebox comprising a conduit system including a trough section mounted on the tender beneath said bin, a conduit section rigidly secured to the locomotive communicating with the firebox, a telescopically arranged intermediate conduit section connecting and forming with the adjacent ends of the trough and the rigidly secured conduit section universal joint formations, a sectional screw conveyor mounted in said conduit system, the sections thereof being universally connected, a bearing at the rear of and formed with said trough, the rearward end of said sectional screw conveyor being journaled in said bearing, upstanding support members rigidly carried by said tender forming guideways extending longitudinally thereof, members depending from said trough for supporting the same, said members being mounted to slide in said guideways for moving said trough longitudinally of the tender and means for securing said trough rigidly in any one of a number of positions longitudinally of the tender whereby the universal connections between the sections of said screw conveyor may be brought to a predetermined position within said universal joint formations, said means including corrugated plates secured to said upstanding members and extending longitudinally of the tender, said corrugated plates being provided with elongated horizontal slots, means carried by said depending support members extending through said elongated slots, said last named means carrying corrugated members arranged for engagement with said corrugated plates and means holding said corrugated plates and members in engagement.

HERBERT W. SNYDER.